US006316082B1

(12) United States Patent
Tomkins et al.

(10) Patent No.: US 6,316,082 B1
(45) Date of Patent: Nov. 13, 2001

(54) LAMINATE STRUCTURE

(75) Inventors: Donald William Tomkins, Charlotte, NC (US); Thomas Anthony Bleasdale, Chorley; Lynn Shona Hardie Fergusson, Barnton, both of (GB)

(73) Assignee: API Group PLC, Cheshire (GB)

( * ) Notice: Subject to any disclaimer, the term of this patent is extended or adjusted under 35 U.S.C. 154(b) by 0 days.

(21) Appl. No.: 09/423,271

(22) PCT Filed: May 7, 1998

(86) PCT No.: PCT/GB98/01322

§ 371 Date: May 5, 2000

§ 102(e) Date: May 5, 2000

(87) PCT Pub. No.: WO98/50241

PCT Pub. Date: Nov. 12, 1998

(30) Foreign Application Priority Data

May 7, 1997 (GB) ..................................................... 9709263

(51) Int. Cl.[7] ........................................................ B32B 3/00

(52) U.S. Cl. ....................... 428/202; 428/913.3; 428/914; 428/915; 283/72; 283/83; 283/100

(58) Field of Search ................................ 428/913.3, 914, 428/915, 202; 283/72, 83, 100

(56) References Cited

U.S. PATENT DOCUMENTS

| | | | |
|---|---|---|---|
| 4,012,552 | 3/1977 | Watts | 428/200 |
| 4,477,312 | 10/1984 | Czichy | 156/656 |
| 4,495,232 | 1/1985 | Bauser et al. | 428/41 |
| 4,591,527 | 5/1986 | Czichy | 428/201 |
| 4,662,653 | 5/1987 | Greenaway | 283/91 |
| 4,687,680 | 8/1987 | Nauri et al. | 427/38 |
| 4,759,969 | 7/1988 | Sander | 428/209 |
| 4,943,093 * | 7/1990 | Melling et al. | 283/83 |
| 5,044,707 | 9/1991 | Mallik | 359/2 |
| 5,145,212 | 9/1992 | Mallik | 283/86 |
| 5,331,443 | 7/1994 | Stanisci | 359/2 |
| 5,411,296 | 5/1995 | Mallik | 283/86 |

FOREIGN PATENT DOCUMENTS

| | | |
|---|---|---|
| 1 141 273 | 2/1983 | (CA) . |
| 1 211 690 | 9/1986 | (CA) . |
| 44 10 431 A1 | 9/1995 | (DE) . |
| 0 188 051 A2 | 7/1986 | (EP) . |
| 0 201 323 B1 | 11/1986 | (EP) . |
| 0 253 089 A1 | 1/1988 | (EP) . |
| 0 330 733 A1 | 9/1989 | (EP) . |
| 0609683A1 | 8/1994 | (EP) . |

* cited by examiner

*Primary Examiner*—Cathy Lam
(74) *Attorney, Agent, or Firm*—Perman & Green, LLP

(57) ABSTRACT

The present invention relates to the field of laminated materials and, in particular, to laminates (1) for stamping foils and security threads (1). In one aspect there is provided a laminate (1) for a stamping foil comprising a carrier layer, a translucent or transparent coloured first lacquer layer (5), a translucent or transparent second lacquer layer (10) disposed between the carrier layer and the first lacquer layer and a light-reflecting layer (20) adjacent to the first lacquer layer, wherein the first lacquer layer is incomplete in a region substantially in register with an incomplete region in the light-reflecting layer such that the carrier layer is partially covered by the first lacquer layer and the light-reflecting layer (20).

40 Claims, 1 Drawing Sheet

LAMINATE STRUCTURE

Figure 1:
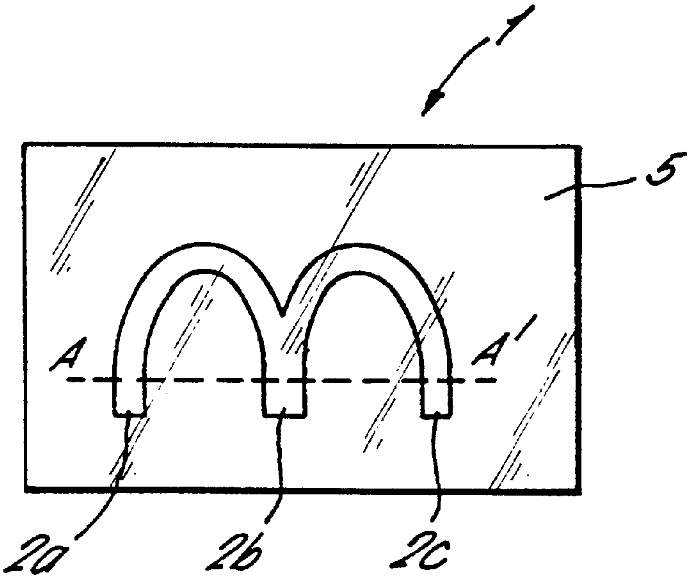

The present invention relates to the field of laminated materials and, in particular, to laminates for stamping foils and security threads.

Stamping foils, including hot-stamping foils, are used to provide decorative surface effects on articles and typically comprise a film laminate of a carrier layer, a release layer, a lacquer or colour layer, a light-reflecting layer usually formed from aluminium, and an adhesive layer or size coat. During stamping, the foil is positioned adjacent to the surface of the article to be marked and heat and/or pressure is applied. This causes the foil to adhere to the surface of the article via the adhesive layer. At this stage, the carrier layer is designed to separate from the other layers and this is facilitated by the release layer. After the carrier layer has been separated from the other layers, the uppermost layer of the foil on the surface of the article is the lacquer layer. This is a transparent or translucent colour layer through which the underlying metal layer is viewed. The lacquer layer may have a pre-printed design thereon. The metal layer provides the foil with reflectiveness and opacity.

Holographic hot-stamping foils find application in the packaging and security industries. A holographic element containing a pattern or information, such as letters, numerals, graphic symbols or the like, is provided within the laminate structure.

Conventional holographic stamping foils are made by the following procedure. A Polyester carrier layer has a release layer applied on to its surface using, for example, direct gravure coating. Next, a thermo-plastic lacquer layer is applied on top of the release layer, again by direct gravure coating for example. The top (free) surface of the thermo-plastic lacquer layer is then holographically embossed using heat and pressure in combination with nickel shims engraved with a holographic pattern or image. Once embossed, the lacquer layer is then metallised with aluminium in a standard metal evaporator to render the foil reflective. Alternatively, the lacquer layer may be metallised prior to the embossing step. A heat and/or pressure activated adhesive or size coat is then applied to form the completed stamping foil. For partially transparent holographic foils the aluminium layer may be discontinuous or replaced by a transparent material of high refractive index which causes a percentage of the incident light to be transmitted.

Security threads or filaments are used for authenticating security documents such as bank notes and generally have a similar laminate structure to the stamping foils described above, but usually do not contain a release layer or an adhesive layer.

U.S. Pat. Nos. 5,044,707, 5,145,212 and 5,411,296 relate to partially transparent holographic foils for authenticating security documents. The foil disclosed in each of these patents comprises a discontinuous metallic reflective layer formed from a plurality of discrete aluminium portions and an overlying continuous lacquer layer having a surface relief pattern formed therein. If the lacquer layer has a yellow dye added then this can give the underlying discrete aluminium portions a gold-like appearance. In this case, however, the regions between the discrete aluminium portions will have a yellow colour. Consequently, when the foil is applied on to the surface of a substrate, the surface will appear yellow in those regions not covered by the aluminium portions. It will be appreciated that this effect is not always desired. For example, if the surface of the substrate comprises a photograph, the coloured lacquer layer will act as a yellow filter through which the photograph is viewed and this will affect the photographic image.

In a first aspect, the present invention provides a laminate for a security thread comprising a translucent or transparent support layer, a translucent or transparent coloured first lacquer layer, a translucent or transparent second lacquer layer disposed between the support layer and the first lacquer layer and a light-reflecting layer adjacent to the first lacquer layer, wherein the first lacquer layer is incomplete in a region substantially in register with an incomplete region in the light-reflecting layer such that the support layer is partially covered by the first lacquer layer and the light-reflecting layer.

If desired, the support layer may comprise a colouring agent, such as a dye, pigment or colourant.

In a second aspect, the present invention provides a laminate for a stamping foil comprising a carrier layer, a translucent or transparent coloured first lacquer layer, a translucent or transparent second lacquer layer disposed between the carrier layer and the first lacquer layer and a light-reflecting layer adjacent to the first lacquer layer, wherein the first lacquer layer is incomplete in a region substantially in register with an incomplete region in the light-reflecting layer such that the carrier layer is partially covered by the first lacquer layer and the light-reflecting layer.

The stamping foil is preferably a hot-stamping foil.

In both aspects of the present invention, the second lacquer layer may comprise a colouring agent, such as a dye, pigment or colourant.

In both aspects of the present invention it will be appreciated that the substantially in register incomplete regions in the first lacquer layer and the light-reflecting layer are complemented by substantially in register complete regions in the said layers. The in register complete regions in the said layers may comprise a plurality of discrete portions or may be continuous.

It will be appreciated that the laminate according to the present invention is not limited solely to the layers described herein and may also include additional layers.

Preferably, the substantially in register incomplete regions in the first lacquer layer and the light-reflecting layer result in a visual element which comprises a pattern, design, marking or a combination of two or more thereof. When the visual element comprises a marking, this may be in the form of alpha-numeric characters, micro-print, graphic symbols, indicia or the like. The visual element may be formed by the substantially in register incomplete regions in the first lacquer layer and the light-reflecting layer or by the complementary substantially in register complete regions or by a combination of the incomplete and complete regions. For instance, the visual element could comprise the alpha-numeric characters "A1" and the shape of one or both of these characters could be provided by the substantially in register complete regions.

A pattern, design, marking or a combination of two or more thereof may be provided on a surface of the first lacquer layer and may be pre-printed thereon. The pattern, design or marking may be three-dimensional and may be formed as a surface relief. In this case, the pattern, design or marking is preferably provided on the surface of the first lacquer layer which faces the light-reflecting layer. The three-dimensional pattern, design or marking may be contained in a hologram or a diffraction grating or a combination thereof. The three-dimensional pattern, design or marking may be formed by processes conventional in the art, such as embossing or stamping. The marking may be in the form of alpha-numeric characters, micro-print, graphic symbols, indicia or the like. Similarly, the second lacquer layer may also have a pattern, design, marking or a combination of two or more thereof as described above.

Advantageously, the laminate according to both aspects of the present invention further comprises a protective layer on a surface of the light-reflecting layer, which surface faces away from the first lacquer layer. The protective layer may be incomplete in a region substantially in register with the incomplete region in the light-reflecting layer and may comprise a resist material. If desired, the protective layer may comprise a colouring agent, such as a dye, pigment or colourant.

The light-reflecting layer of the laminate of the present invention is preferably formed from a metal or alloy, for example from Al, Cu, Ni, Cr, Fe, Ag or Au or an alloy of two or more thereof. This layer typically has a coating thickness of less than 1 $\mu$m and ideally has an optical density of around 2.4. Alternatively, the light-reflecting layer may be formed from a transparent or translucent material having a high refractive index, such as ZnS and the materials disclosed in EP-B-0 201 323. The light-reflecting layer will generally reflect light off both of its surfaces. In the present invention, however, it is sufficient for the light-reflecting layer to reflect light only off the surface which faces the first lacquer layer.

The support layer and carrier layers may comprise polyester, polypropylene, polyethylene or a mixture of two or more thereof. More preferably, the support and carrier layers comprise a polyester film having a thickness of in the range of from 12 to 26 $\mu$m, preferably approximately 19 $\mu$m.

The first lacquer layer is advantageously formed from a material which is substantially soluble in an alkaline solution, although materials soluble in water, an acidic solution or an organic solvent, such as toluene, may also be used. The first lacquer layer may be coloured by a colouring agent, such as a dye, colourant or pigment, including combinations thereof. If the light-reflecting layer is formed from a material which is substantially soluble in an alkaline solution, such as sodium hydroxide, then the first lacquer layer preferably comprises an alkali removable polymer having an acid value of less than approximately 50. Advantageously the first lacquer layer comprises an anhydride or acid functionality, more preferably styrene maleic anhydride and a colouring agent, such as a dye, colourant or pigment, including combinations thereof. A modified cellulose acetate material may also be used. The first lacquer layer typically has a thickness in the range of from 0.5 to 1.0 $\mu$m and preferably about 0.8 $\mu$m.

A preferred first lacquer layer comprises one or more alkali or water soluble polymers or resins and one or more microdispersed pigments. Microdispersed pigments have been found to exhibit the advantage of reducing colour migration between the layers of the foil. Preparations of these pigments exhibit excellent colour strength and transparency. They are available in a wide range of colours. The pigments which colour the water-based first lacquer layer may require an alkali and/or an alcohol to facilitate initial dispersion during the coating phase, which then aids solubility during the demetallisation process. This also improves the durability properties of the finished product, particularly water resistance, and makes redispersion in the caustic etching solutions easier. Preferred pigments include the MICROLITH-WA range from CIBA, which consist of pigment preparations for aqueous gravure and flexographic printing of packaging of materials. The preparations are based on organic pigments of various chemical classes and are characterised by their good compatibility with water. They are predispersed in a water-soluble, monomer-free acrylic resin. Their narrow range of very fine particle sizes produce pigment preparations which exhibit excellent colour strength and outstanding gloss and transparency. This makes them particularly suitable for use in water-based lacquers for hot stamping foils. Their flocculation and sedimentation stability guarantee easy processing and storage properties of solutions manufactured with them. In addition, pigment preparations are odourless and not abrasive to gravure cylinders. The microdispersed pigment preparations are compatible with alkaline or neutral solutions or dispersions of, for example, one or more of the following water-based binder classes: acrylic resins, polyurethane resins, polyvinyl alcohol, polyvinyl acetate, acrylic/styrene copolymers, maleic resins, phthalate resins and PVC latexes. In addition they show good compatibility with standard hardeners for aqueous systems. They are generally not compatible with acidic systems. A preferred choice of amines for dispersion of these pigments has been found to be 25% ammonia, although other alkalis, such as amino methyl propanol and dimethyl amino methyl propanol, may also be used. The pigments are available in a variety of colours including: MICROLITH Yellow 3G-WA, MICROLITH Yellow BAW-WA, MICROLITH Yellow 2R-WA, MICROLITH Brown 5R-WA, MICROLITH Scarlet R-WA, MICROLITH Red RBS-WA, MICROLITH Magenta B-WA, MICROLITH Violet RL-WA, MICROLITH Blue 4G-WA and MICROLITH Black C-WA. These colours can be used on their own or two or more can be blended to make an extensive range of other shades. They may typically be prepared as 25% solid solutions (apart from Violet which is generally prepared as 20% solids) in a blend of water, alcohol and ammonia (or other suitable alkali). Dispersions of these pigments comply with regulations on VOC content of water based systems.

The demetallisation process may be carried out in one of two ways: alkali is applied to the metal layer in a desired pattern, which then dissolves the metal layer and the coloured alkali-soluble first lacquer layer; or an alkali-insoluble layer is applied to the metal in the desired pattern and the areas around it are demetallised using alkali.

The second lacquer layer is preferably substantially insoluble in the solution in which the first lacquer layer is soluble and preferably comprises a thermoset or a thermoplastic material, such as an acrylic, a vinyl polymer, a polystyrene or a polyamide or copolymers thereof. The second lacquer layer may contain a colouring agent, such as a dye, colourant or pigment. More preferably, the second lacquer layer comprises polymethylmethacrylate and nitrocellulose. The ratio of polymethylmethacrylate to nitrocellulose is preferably in the range of from 10:1 to 2:1. The second lacquer layer may be applied from a ketone/cellosolve and optionally toluene blend to give a final thickness in the range of from 0.5–2.0 $\mu$m, preferably 1.0–1.5 $\mu$m. A suitable composition comprises 69.2 parts Methyl ethyl ketone, 13.9 parts Toluene, 14.6 parts Neocryl B811 (Zeneca) and 2.3 parts Industrial Nitrocellulose DHX 3–5 IPA (ICI) (all parts by weight). The solvent-based durable second lacquer layer preferably comprises one or more polymers which are insoluble in water and alkali so they are not effected during the etching process.

The first and second lacquer layers may contain cross-linking agents, plasticisers and other additives to provide them with desired physical and chemical properties, for example abrasion and wear resistance. The first and second lacquer layers may be curable.

In order to reduce dye migration between the first and second lacquer layers, a third lacquer layer is advantageously interposed therebetween. The third lacquer layer preferably comprises an anhydride or acid functionality, more preferably styrene maleic anhydride, typically applied from a ketone and/or alcohol solvent blend. A modified cellulose acetate material may also be used. The provision of a third lacquer layer is especially beneficial in cases where the first lacquer layer has a high colouration. The third lacquer layer is preferably translucent or transparent. Typically, the thickness of the third lacquer layer will be in the range of from 0.5 to 1.0 μm and preferably about 0.6 μm.

It has also been found that if the colouring agent in the first lacquer layer is a microdispersed pigment, then dye migration between the layers can further be reduced. In this case, the third lacquer layer may be dispensed with if desired.

Preferably, the laminate for use as a stamping foil in the second aspect of the invention further comprises a release layer disposed between the carrier layer and the second lacquer layer. Ideally, the release layer should provide adhesion of the carrier layer to the other layers when the foil is cold, but should release the carrier layer when the foil is heated. The release layer preferably comprises a heat-softenable wax, more preferably a modified montan wax. The wax coating is preferably applied in a ketone/aromatic hydrocarbon solvent system to provide a final coating thickness of in the range of from 0.005 to 0.02 μm, preferably approximately 0.01 μm.

In both aspects of the present invention the laminate may further comprises an adhesive layer disposed on a surface of the light-reflecting layer, which surface faces away from the first lacquer layer or, in the case where a protective layer is present, disposed on a surface of the protective layer, which surface faces away from the light-reflecting layer.

If desired, the adhesive layer may contain a colouring agent, such as a dye, colourant or pigment. The adhesive layer is tailored to suit the application substrate and may be pressure and/or heat sensitive. With regard to the second aspect of the present invention, the adhesive layer should ideally be non-tacky when the stamping foil is cold prior to stamping, but should become tacky when the foil is heated (typically in the range of from 80° C. to 150° C.). Typically, the adhesive layer has a thickness of in the range of from 0.2–3 μm, preferably 0.5–2.0 μm. The adhesive layer may have an adhesion-promoter layer associated therewith. For security and tamper-proof applications the adhesive may be chosen to have a shear strength greater than that which exists between the other layers. Accordingly, an attempt to remove the laminate from an article will result in the various layers being torn apart. If an adhesive is provided on the surface of the article to be stamped, then the adhesive layer may be dispensed with.

The present invention also provides an article which has stamped on one or more surfaces thereof a laminate as herein described. The article could comprise a container, a carton, a card, a bottle, a label, packaging material, a security document, a record, a ticket, a cheque, a financial card, a banknote, an identity card, a passport or a driver's license. Any of the stamping operations conventional in the art can be used to mark the article.

The present invention also provides a security document, a record, a ticket, a cheque, a financial card, a banknote, an identity card, a passport or a driver's license comprising a laminate as herein described.

The present invention also provides a method of providing an information, decorative or security element on the surface of an article comprising the steps of:

(a) positioning a laminate as herein described with reference to the second aspect of the present invention adjacent to the surface of the article such that the carrier layer faces away from the surface;

(b) applying pressure and/or heat to the foil such that the foil adheres to the surface of the article; and (c) removing the carrier layer.

The present invention also provides a process for making a laminate as herein described, which process comprises the steps of:

(i) applying the second lacquer layer on to the support layer or carrier layer;

(ii) applying the first lacquer layer on to the second lacquer layer;

(iii) applying the light reflective layer on to the first lacquer layer;

(iv) applying a resist mask on to the light reflective layer to define one or more regions which are not to be removed; and (v) contacting the laminate and resist mask from step (iv) with at least one chemical so as to substantially remove the light-reflecting layer and the first lacquer layer in regions not covered by the resist mask.

A more detailed account of the preferred process for making a laminate for a stamping foil according to the present invention is given below.

First, a release layer is applied on to the surface of a polyester carrier layer by, for example, direct gravure coating. Next, a second lacquer layer is applied on top of the release layer, again by direct gravure coating. A first coloured lacquer layer is then applied on top of the second lacquer layer, also by direct gravure coating. The first lacquer layer preferably comprises a coloured styrene maleic anhydride resin.

If desired, the top (free) surface of the first lacquer layer may be holographically embossed using heat and pressure in combination with nickel shims engraved with a holographic pattern or image. Alternatively, a surface relief may be provided in the top surface by a casting operation conventional in the art. The depth of the three-dimensional pattern embossed on the lacquer layer is typically 0.3 μm or less, more typically 0.1 μm or less.

A light-reflecting layer, preferably aluminium, is then applied on to the embossed lacquer surface using, for example, a standard metal evaporator.

In the next step, a resist mask may be applied on top of the light-reflecting layer by any of the well known printing techniques, such as gravure, silk screen, flexographic, letter press, off-set or photolithography. Gravure printing is preferred and this allows a very high resolution print. The resist mask defines the regions which are not to be removed and the resist may comprise a wax, resin or gel conventional in the art, such as a modified polyvinyl acetate. After the resist mask has been applied, the laminate is submerged in a solution which attacks both the light-reflecting layer and the first lacquer layer, for example, sodium hydroxide solution. By this process the light-reflecting layer and the first lacquer layer are removed in register in regions which are not covered by the resist mask. The second lacquer layer, the release layer and the carrier layer are not removed by this process. The laminate may then be washed to remove the remnants of the solution. It will be appreciated that the laminate may be submerged in a first solution which removes only the light-reflecting layer followed by a second solution which removes only the first lacquer layer. For instance, the first lacquer layer could be resistant to sodium hydroxide solution but could be substantially soluble in water and in this case the second solution comprises water.

A suitable water soluble first lacquer layer comprises polyvinyl alcohol. Of course, the first lacquer layer could be resistant to sodium hydroxide solution but could be substantially soluble in an organic solvent, such as toluene, and in this case the second solution comprises the organic solvent. The resist material remaining on the now incomplete light-reflecting layer may be removed in a subsequent processing step or may be left in place to provide a protective layer.

If a water soluble first lacquer is used and if the light-reflecting layer is sufficiently porous, then water will be able to penetrate the light-reflecting layer in those regions which are not covered by the resist mask. Accordingly, the underlying lacquer layer will be dissolved in these regions and the in register regions in the light-reflecting layer thereby dislodged.

After the in register regions of the light reflecting layer and first lacquer layer have been removed the optional protective and adhesive layers may then be applied.

Figure 2:
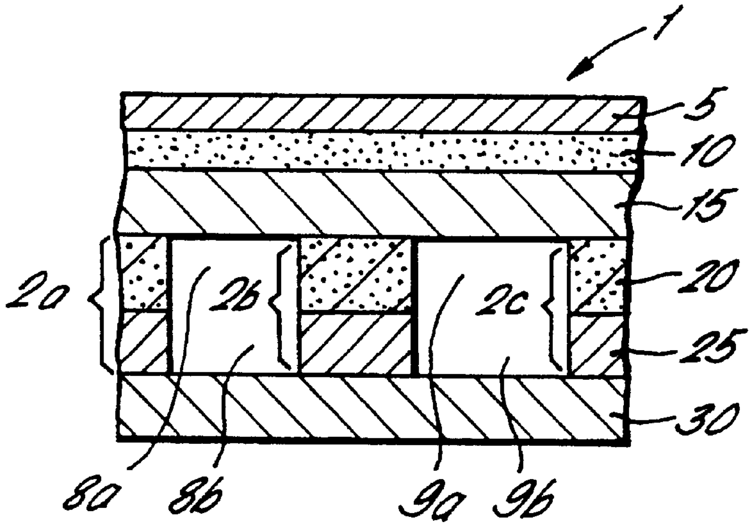

The present invention will now be described by way of example with reference to the accompanying drawing in which:

FIG. 1 is a top view of a laminate for a stamping foil according to the second aspect of the present invention; and FIG. 2 is a cross-section through the line AA' of the laminate illustrated in FIG. 1.

In FIG. 1, a laminate 1 for a stamping foil is illustrated which has a visual element consisting of the character "m" and portions of the three legs of the "m" character along the line AA' are indicated as 2*a*, 2*b* and 2*c*. FIG. 2 illustrates a cross-section through the line AA' and it can be seen that the laminate 1 consists of six layers, which are, in turn, a transparent carrier layer 5, a release layer 10, a transparent lacquer layer 15, an incomplete transparent and coloured lacquer layer 20, an incomplete light-reflecting metal layer 25 and an adhesive layer 30. As shown, the lacquer layer 20 is incomplete in two regions 8*a* and 9*a* which are substantially in register with two incomplete regions 8*b* and 9*b*, respectively, in the metal layer 25. The "m" character is provided by the complementary in register complete regions in the first lacquer layer 20 and metal layer 25 and these are indicated as 2*a*, 2*b* and 2*c* along the line AA'. When the laminate 1 is viewed with the carrier layer 5 uppermost (as shown in FIG. 1), incomplete in register regions 8*a* and 8*b* and 9*a* and 9*b* appear clear and uncoloured, since the carrier layer 5 is not covered by the coloured lacquer layer 20 and metal layer 25 in these regions. In the remaining regions of the laminate 1, the metal layer 25 is viewed through the lacquer layer 20. If the metal layer 25 is aluminium and the lacquer layer 10 has a yellow colouring, then this provides the "m" character with a gold-like appearance.

During stamping, the laminate 1 is positioned with the adhesive layer 30 facing and adjacent to the article to be marked. The laminate 1 is pressed against the article with the application of heat and this activates the release 10 and adhesive 30 layers, resulting in the release of carrier layer 5 from the other layers and the adhesion of the laminate 1 to the article via the adhesive layer 30. The carrier layer 5 is subsequently removed by peeling it away from the other layers.

It will be appreciated that the lacquer layer 20 may have a pattern, design or marking provided on a surface thereof. The same or a different pattern, design or marking may be provided on a surface of lacquer layer 15. The pattern, design or marking may be three-dimensional and may be contained in a hologram or a diffraction grating.

Because a pattern, design or marking is already present in the laminate according to the present invention by virtue of the incomplete in register regions, the laminate can simply be applied to an article without having to stamp the particular pattern, design or marking required.

The present invention will now be described further with reference to the following Examples.

EXAMPLE 1

A stamping foil according to one aspect of the present invention was prepared using the following formulations. All % are by weight.

| | |
|---|---|
| Release Layer | |
| Carnauba Wax | 0.72% |
| Stadis 450 | 0.16% |
| Toluene | 79.04% |
| Industrial Methylated Spirits | 20.08% |
| Second Lacquer Layer | |
| Nitrocellulose DHX 3 | 10.83% |
| Paraloid B-99 (50%) | 29.55% |
| Methyl Ethyl Ketone | 59.62% |
| First Lacquer Layer | |
| Joncryl 61 | 53.87% |
| Joncryl 585 | 10.75% |
| Microlith RL-WA Violet | 5.66%* |
| Water | 29.72% |
| Microlith RL-WA Violet | 20% |
| Water | 58% |
| Industrial Methylated Spirits | 20% |
| Ammonia | 2% |
| Adhesive Layer | |
| Plexigum P24 | 3.76% |
| Advantage Plus | 5.09% |
| Mowilith CT5 | 6.31% |
| Aluminium Trihydrate SF11E | 2.49% |
| Acetone | 4.20% |
| Methyl Ethyl Ketone | 26.70% |
| Industrial Methylated Spirits | 51.45% |

*Preparation of Microlith RL-WA Violet (CIBA) microdispersed pigment concentrate The wax release layer is applied from a 0.9% solids solution. It is coated on to a polyester. carrier layer (approximately 12 $\mu$m thick) by forward gravure at 180 metres per minute to form a layer of approximately 0.01 gsm. The solvent-based second lacquer layer is then coated from a 26% solids solution which comprises a methylmethacrylate copolymer and nitrocellulose. It is applied with a 004K bar and conditioned at 100° C. for one minute to form a layer of from 1.0 to 1.3 gsm. Next, the water-based first (coloured) lacquer layer is coated from a 24.8% solids solution comprising water-based, alkali-soluble polymers. The colour is achieved using high performance organic microdispersed pigments. This layer is applied with a 004K bar and conditioned at 100° C. for one minute to form a layer of from 1.5 to 2.0 gsm. A metal layer consisting of vacuum deposited aluminium is then applied having an optical density of around 2.4. Demetallisation may be carried out in one of two ways: alkali is applied to the metal layer in a desired pattern, this then dissolves the metal layer and the coloured alkali-soluble first lacquer layer; or an alkali insoluble layer (resist) is applied on to the metal in the desired pattern and the areas around it are demetallised using alkali. Finally, the adhesive layer is applied (approximately 1.5 gsm). The adhesive is formulated to turn clear on hot stamping.

EXAMPLE 2

A stamping foil according to another aspect of the present invention was prepared using the following formulations to apply a first lacquer layer (embossable, coloured and caustic removable), a second lacquer layer (clear) and, additionally, a third lacquer layer (clear and caustic removable) interposed therebetween in order to resist dye migration. All parts are by weight.

| | |
|---|---|
| First Lacquer Layer | |
| Methyl Ethyl Ketone | 6.8 parts |
| Methoxypropanol | 1.1 parts |
| SMA 1000 (Elf Atochem) | 0.4 parts |
| Surcol 441 (Allied Colloid) | 1.6 parts |
| Dye (Orasol Orange G Ciba Geigy) | 0.1 parts |
| Coat thickness approximately 0.8 μm. | |
| Second Lacquer Layer | |
| Methyl Ethyl Ketone | 69.2 parts |
| Toluene | 13.9 parts |
| Neocryl B811 (Zeneca) | 14.6 parts |
| Industrial Nitrocellulose DHX 3-5 IPA (ICI) | 2.3 parts |
| Coat thickness approximately 0.8 μm. | |
| Third Lacquer Layer | |
| Methyl Ethyl Ketone | 6.6 parts |
| Methoxypropanol | 0.9 parts |
| SMA 1000 (Elf Atochem) | 1.5 parts |
| Surcol 441 (Allied Colloid) | 1.0 parts |
| Coat thickness approximately 0.6 μm. | |

The present invention provides a laminate structure having a lacquer layer which is incomplete in one or more regions substantially in register with corresponding one or more regions in an adjacent light-reflecting layer. Accordingly, regions where the light-reflecting layer is not present can be coloured independently of regions where it is present. Since a pattern, design or marking is already present in the laminate according to the present invention, the laminate can simply be applied to an article without having to stamp the particular pattern, design or marking required. This reduces the skill and time required for the stamping operation.

The in register incomplete regions and the complementary in register complete regions in the laminate can be of very fine detail and high resolution patterns, designs and markings are therefore possible.

What is claimed is:

1. A security thread laminate comprising a translucent or transparent support layer, a translucent or transparent coloured first lacquer layer, a translucent or transparent second lacquer layer disposed between the support layer and the first lacquer layer and a light-reflecting layer adjacent to the first lacquer layer, wherein the first lacquer layer is incomplete in a region substantially in register with an incomplete region in the light-reflecting layer such that the support layer and the second lacquer layer are partially covered by the first lacquer layer and the light-reflecting layer.

2. A laminate as claimed in claim 1, further comprising a third lacquer layer interposed between the first and second lacquer layers to resist dye migration.

3. A laminate as claimed in claim 2, wherein the third lacquer layer comprises styrene maleic anhydride or a modified cellulose acetate.

4. A laminate as claimed in claim 1, wherein the first lacquer layer comprises one or more microdispersed pigments.

5. A laminate as claimed in claim 1, wherein the substantially in register incomplete regions in the first lacquer layer and the light-reflecting layer result in a visual element which comprises a pattern, design, marking or a combination of two or more thereof.

6. A laminate as claimed in claim 1, wherein a pattern, design, marking or a combination of two or more thereof is provided on a surface of the first lacquer layer.

7. A laminate as claimed in claim 1, wherein a three-dimensional pattern, design, marking or a combination of two or more thereof is provided on a surface of the first lacquer layer, which surface faces the light-reflecting layer.

8. A laminate as claimed in claim 7, wherein the three-dimensional pattern, design or marking or combination of two or more thereof is contained in a hologram or a diffraction grating or a combination thereof.

9. A laminate as claimed in claim 1, further comprising a protective layer on a surface of the light-reflecting layer, which surface faces away from the first lacquer layer.

10. A laminate as claimed in claim 9, wherein the protective layer is incomplete in a region in register with the incomplete region in the light-reflecting layer.

11. A laminate as claimed in claim 9, wherein the protective layer comprises a resist material.

12. A laminate as claimed in claim 9, further comprising an adhesive layer disposed on a surface of the protective layer, which surface faces away from the light-reflecting layer.

13. A laminate as claimed in claim 1, further comprising an adhesive layer disposed on a surface of the light-reflecting layer, which surface faces away from the first lacquer layer.

14. A laminate as claimed in claim 1, wherein the light-reflecting layer is formed from a metal or alloy.

15. A laminate as claimed in claim 14, wherein the light-reflecting layer is formed from Al, Cu, Ni, Cr, Fe, Ag or Au or an alloy of two or more thereof.

16. A laminate as claimed in claim 1, wherein the light-reflecting layer is formed from a transparent or translucent material having a high refractive index.

17. A laminate as claimed in claim 1, wherein the support layer comprises polyester, polypropylene, polyethylene or a mixture of two or more thereof.

18. A laminate as claimed in claim 1, wherein the first lacquer layer is formed form a material which is substantially soluble in water, an alkaline solution, an acidic solution or an organic solvent.

19. A laminate as claimed in claim 18, wherein the second lacquer layer is substantially insoluble in the solution in which the first lacquer layer is soluble.

20. A laminate as claimed in claim 1, wherein the first lacquer layer comprises styrene maleic anhydride and a colouring agent.

21. A laminate as claimed in claim 1, wherein the second lacquer layer comprises an acrylic, a vinyl polymer, a polystyrene or a polyamide or copolymers thereof and optionally a colouring agent.

22. A security thread laminate as in claim 1, wherein the second lacquer layer is partially covered by the first lacquer layer and the light-reflecting layer.

23. A security document, a record, a ticket, a cheque, a financial card, a banknote, an identity card, a passport or a driver's license comprising a laminate as claimed in claim 1.

24. A laminate for a stamping foil comprising a carrier layer, a translucent or transparent coloured first lacquer layer, a translucent or transparent second lacquer layer disposed between the carrier layer and the first lacquer layer and a light-reflecting layer adjacent to the first lacquer layer, wherein the first lacquer layer is incomplete in a region substantially in register with an incomplete region in the light-reflecting layer such that the second lacquer layer is partially covered by the first lacquer layer and the light-reflecting layer.

25. A laminate as claimed in claim 24, further comprising a release layer disposed between the carrier layer and the second lacquer layer.

26. A laminate as claimed in claim 24, wherein the carrier layer comprises polyester, polypropylene, polyethylene or a mixture of two or more thereof.

27. An article having stamped thereon a laminate as claimed in claim 24.

28. An article as claimed in claim 27, which is a container, a carton, a card, a bottle, a label or a packaging material.

29. An article as claimed in claim 27, which is a security document, a record, a ticket, a cheque, a financial card, a banknote, an identity card, a passport or a driver's license.

30. A method of providing an information, decorative or security element on the surface of an article comprising the steps of:

(a) positioning a laminate as claimed in claim 24 adjacent to the surface of the article such that the carrier layer faces away from the surface;

(b) applying pressure and/or heat to the foil such that the foil adheres to the surface of the article; and (c) removing the carrier layer.

31. A laminate as claimed in claim 24, wherein the first lacquer layer is formed from a material which is substantially soluble in water, an alkaline solution, an acidic solution or an organic solvent.

32. A laminate as claimed in claim 31, wherein the second lacquer layer is substantially insoluble in the solution in which the first lacquer layer is soluble.

33. A laminate as claimed in claim 24, wherein the first lacquer layer comprises styrene maleic anhydride and a colouring agent.

34. A laminate as claimed in claim 24, wherein the second lacquer layer comprises an acrylic, a vinyl polymer, a polystyrene or a polyamide or copolymers thereof and optionally a colouring agent.

35. A process for making a laminate for a security thread having a translucent or transparent support layer, a translucent or transparent coloured first lacquer layer, a translucent or transparent second lacquer layer and a light-reflecting layer, the first lacquer layer being incomplete in a region substantially in register with an incomplete region in the light-reflecting layer, which process comprises the steps of:

(i) applying the second lacquer layer on to the support layer;

(ii) applying the first lacquer layer on to the second lacquer layer;

(iii) applying the light reflective layer on to the first lacquer layer;

(iv) applying a resist mask on to the light reflective layer to define one or more regions which are not to be removed; and (v) contacting the laminate and resist mask from step (iv) with at least one chemical so as to substantially remove the light-reflecting layer and the first lacquer layer in regions not covered by the resist mask without removing the second lacquer layer in the regions not covered by the resist mask.

36. A process as claimed in claim 35, wherein the said at least one chemical comprises an alkaline solution.

37. A process as claimed in claim 35, wherein, prior to step (ii), a third lacquer layer is applied onto the second lacquer layer from step (i) in order to resist dye migration between the said first and second lacquer layers.

38. A process according to claim 35, wherein the light-reflecting layer and the first lacquer layer are removed such that incomplete regions of the light-reflecting layer and the first lacquer layer are substantially in register with each other, and the second lacquer layer is partially covered by the first lacquer layer and the light-reflecting layer.

39. A process for making a laminate for a stamping foil having a carrier layer, a translucent or transparent coloured first lacquer layer, a translucent or transparent second lacquer layer and a light-reflecting layer, the first lacquer layer being incomplete in a region substantially in register with an incomplete region in the light-reflecting layer, which process comprises the steps of:

(i) applying the second lacquer layer on to the carrier layer;

(ii) applying the first lacquer layer on to the second lacquer layer;

(iii) applying the light reflective layer on to the first lacquer layer;

(iv) applying a resist mask on to the light reflective layer to define one or more regions which are not to be removed; and (v) contacting the laminate and resist mask from step (iv) with at least one chemical so as to substantially remove the light-reflecting layer and the first lacquer layer in regions not covered by the resist mask without removing the second lacquer layer in the regions not covered by the resist mask.

40. A process according to claim 39, wherein the light-reflecting layer and the first lacquer layer are removed such that incomplete regions of the light-reflecting layer and the first lacquer layer are substantially in register with each other, and the second lacquer layer is partially covered by the first lacquer layer and the light-reflecting layer.

* * * * *